Aug. 15, 1967
J. C. BLACKETT
3,336,479
FLAME CONDITION DETECTION USING A
NON-SELF-QUENCHING ULTRA-VIOLET
SENSITIVE GEIGER TUBE
Filed Jan. 28, 1965
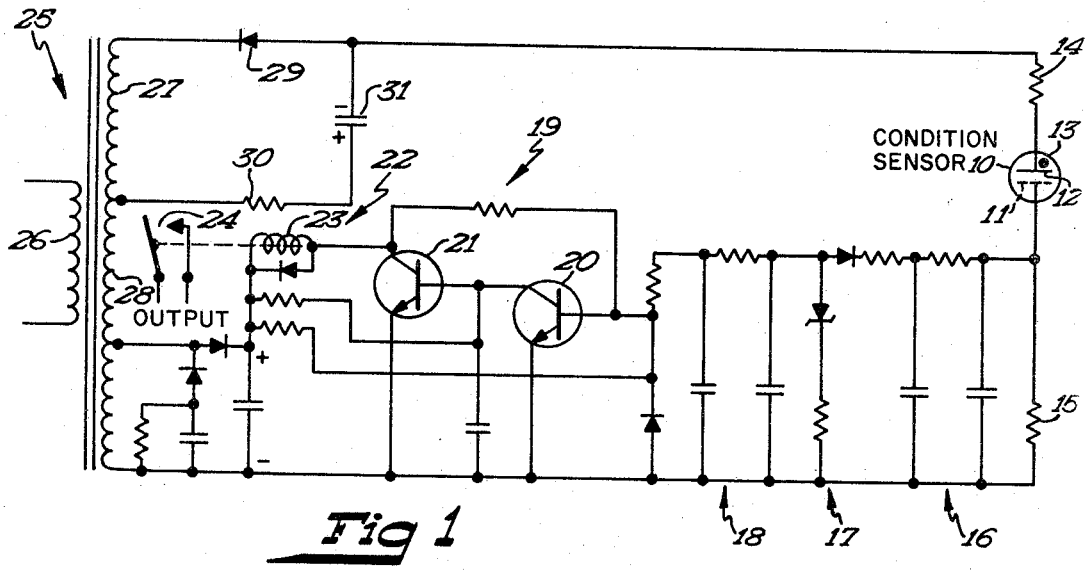
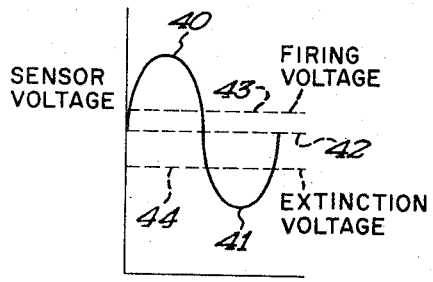
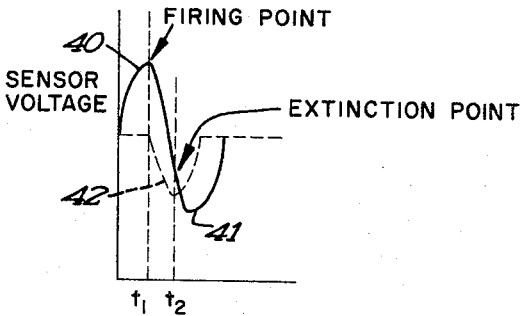
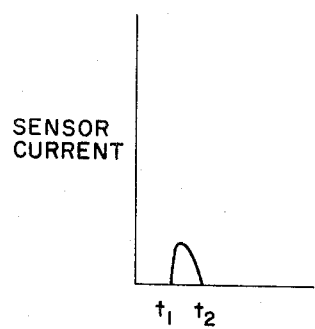
INVENTOR.
JAMES C. BLACKETT
BY
*[signature]*
ATTORNEY

United States Patent Office 3,336,479
Patented Aug. 15, 1967

3,336,479
FLAME CONDITION DETECTION USING A NON-SELF-QUENCHING ULTRA-VIOLET SENSITIVE GEIGER TUBE
James C. Blackett, St. Louis Park, Minn., assignor to Honeywell Inc., a corporation of Delaware
Filed Jan. 28, 1965, Ser. No. 428,708
6 Claims. (Cl. 250—83.6)

ABSTRACT OF THE DISCLOSURE

A non-self-quenching ultraviolet sensitive Geiger tube whose electrical power supply consists of two series connected voltage sources, (1) a capacitor which is charged to a DC voltage below the firing voltage of the tube, and (2) a source of AC voltage, the magnitude of the AC source being such that the tube is ionizing during one-half cycle of the AC source and is quenched during the other half cycle of the AC source, the discharge of the capacitor during said one-half cycle effecting complete ionization of the tube.

---

My invention is concerned with an improved condition detector and particularly with an improved Geiger tube type condition detector in which the Geiger tube may be responsive, for example, to the ultraviolet electromagnetic wave energy present in a condition such as a fire. In describing the preferred embodiment of my invention I describe an ultraviolet sensitive flame detector of the type for use with furnace combustion safeguard equipment.

My invention is of utility when utilizing a gaseous discharge condition sensing means having an anode, a cathode and an ionizable gaseous medium, the condition sensing means being generally known, for example, as a Geiger tube. The structure of my invention insures that for each "count" of the Geiger tube, the gaseous medium between the electrodes will be completely ionized. By this construction I obtain long life of the tube and avoid sensitivity change with tube age.

Prior art structures, utilizing a condition sensing means of this general type, are constructed and arranged to allow current pulses to flow through the tube which may not completely ionize the tube. This condition contributes to deterioration of the electrode surfaces of the tube and results in lower sensitivity.

The structure of my invention utilizes a capacitor which is charged to provide a DC operating voltage to be applied to the electrodes of the tube. In series with this DC operating voltage I connect a source of AC voltage having first and second half cycles. The half cycle of the AC voltage which aids the capacitor voltage can be defined as the positive half cycle, whereas the half cycle which opposes the voltage on the capacitor can be defined as the negative half cycle. With the structure of my invention the Geiger tube is rendered sensitive to ionizing events during the positive half cycle and is quenched during the negative half cycle. Furthermore, an ionizing event which occurs at any time during the positive half cycle is effective to initiate complete ionization of the Geiger tube gas by virtue of the sudden discharge of the capacitor through the tube, it being remembered that positive voltage is applied to the electrodes of the tube during the positive half cycle of the AC voltage.

My invention will be apparent to those skilled in the art upon reference to the following specification, claims and drawings, of which:

FIGURE 1 is a schematic representation of a preferred embodiment of my invention, FIGURE 2 is a graphical representation of the voltage applied to the electrodes of the sensor when a count is not experienced, FIGURE 3 is a graphical representation similar to FIGURE 2, showing a condition in which an ionizing event occurs during the positive half cycle of the AC voltage, and FIGURE 4 is a schematic representation of the sensor current which results from the condition defined in FIGURE 3, showing the steep wave front of current passing through the sensor, as initiated by discharge of the capacitor, to insure complete ionization of the sensor.

Referring to FIGURE 1, reference numeral 10 designates a condition sensor having a screen-like anode 11 and a cathode 12 disposed within a radiation permeable envelope 13 which is filled with an ionizable gas. Condition sensor 10 is shown somewhat schematically and may be of the type shown in the Robert O. Engh and Robert G. Johnson copending patent application Ser. No. 402,785, filed Oct. 9, 1964.

Connected in circuit with the anode and cathode electrodes of the condition sensor are a pair of resistors 14 and 15. Resistor 15 can be considered to be the load resistor for the condition sensor. A first integrating circuit 16 has its input connected across resistor 15. The output of the integrator 16 is applied to a clipping circuit 17, the output of the clipping circuit being connected to the input of a second integrating circuit 18. The structural components of integrating circuits 16 and 18 are such that integrating circuit 16 has a relatively short time constant, as compared to the time constant of integrating circuit 18.

The output of integrating circuit 18 is connected to the input of a transistor switch 19 having a pair of transistors 20 and 21. Transistor 20 is normally conductive, thus maintaining transistor 21 conductive.

The output of the apparatus as disclosed in FIGURE 1 consists of a relay 22 having a winding 23 connected to the output electrodes of transistor 21, and having a normally open switch 24 adapted to be connected to further circuit means, not shown. Upon condition sensor 10 sensing a sustained count, as evidence of the condition to be detected, transistor 21 is rendered conductive and relay 22 is energized to close switch 24.

As I have mentioned, the structure of FIGURE 1 is preferably a flame detector of the type to be used in combustion safeguard equipment. In this case, condition sensor 10 is located to view the fire box of a furnace and relay 22 is a flame relay which, when energized, indicates that a fire is properly maintained within the firebox.

The essence of my invention relates to the manner in which operating voltage is applied to the electrodes of condition sensor 10.

This operating voltage is supplied from transformer 25 having a primary winding 26 which is connected to a source of AC voltage, not shown. The secondary winding of transformer 25 consists of a first source of AC voltage 27 and a second source of AC voltage 28, the lower portion of which supplies DC operating voltage for transistor network 19.

The first source of AC voltage 27 is connected through rectifying means 29 and impedance means in the form of a resistor 30 to charge a capacitor 31 to the polarity shown. The negative terminal of capacitor 31 is connected through resistor 14 to the cathode 12 of condition sensor 10. The positive terminal of capacitor 31 is connected through resistor 30, the second source of AC voltage 28, and load resistor 15 to the anode 11 of condition sensor 10. Resistor 30 functions as a current limiting resistor, controlling the rate of charge and discharge of capacitor 31.

Referring to FIGURE 2, this figure discloses the anode-to-cathode voltage applied to the electrodes of condition sensor 10 when the sensor is not subjected to an ionizing event. Reference numeral 40 identifies the positive half cycle of the AC source 28, whereas reference numeral 41 designated the negative half cycle of this source of voltage. The broken line identified by reference numeral 42 designates the potential level of the charged capacitor 31, this potential constituting a pedestal upon which AC voltage 28 is superimposed. Broken lines 43 and 44 identify respectively the firing voltage and the extinction voltage of condition sensor 10. Thus, by correlating the intersection of the lines 43 and 44 with the sensor voltage as represented by the curve 40–41, the point at which the condition sensor is first rendered sensitive and may be first quenched can be determined. As will be apparent, the exact time of quenching cannot be determined accurately from FIGURE 2 by virtue of the fact that capacitor 31 discharges upon an ionizing event being experienced by condition sensor 10.

In a particular construction of the apparatus of FIGURE 1, the potential level of the broken line 42 was 224 volts, that of broken line 43 was 230 volts, that of broken line 44 was 185 volts, and the peak-to-peak voltage of the AC curve 40–41 was 236 volts.

In FIGURE 3 I depict a condition wherein condition sensor 10 experiences an ionization event at time $t_1$, labeled "firing point." As can be seen from FIGURE 3, ionization of condition sensor 10 causes a sudden discharge of capacitor 31, as evidenced by the negative excursion of broken line 42. Since AC voltage 28 is superimposed upon the now decreasing voltage of capacitor 31, the extinction point for condition sensor 10 occurs at time $t_2$. At this point discharge of capacitor 31 is interrupted and the capacitor recharges to the quiescent level, for example 224 volts.

It will be remembered that an essential feature of my invention is that the DC voltage, as provided by capacitor 31, be capable of supplying a sudden rush of current through condition sensor 10 to insure complete ionization of the sensor. This condition is represented in FIGURE 4 wherein the current pulse through the sensor, which flows between the times $t_1$ and $t_2$, is shown to have a steep rising wave front, as caused by the sudden discharge of capacitor 31.

Referring again to FIGURE 3, complete ionization of condition sensor 10 is insured by virtue of the negative excursion of the AC voltage 28 after the time $t_2$ until such time on the succeeding positive half cycle wherein the electrode voltage of condition sensor 10 again reaches the firing voltage, for example, 230 volts.

From the above description it can be seen that I have provided a simple power supply arrangement for a gaseous discharge type condition sensor wherein I have structurally interconnected a source of DC voltage and a source of AC voltage to both provide a sudden rush of current through the condition sensor for each ionizing event, and to insure quenching of the condition sensor after each ionizing event.

Modifications of my invention will be apparent to those skilled in the art and it is therefore intended that the scope of my invention be limited solely by the scope of the appended claims.

I claim as my invention:
1. A condition detector comprising:
   gaseous discharge condition sensing means having an anode and a cathode and having an ionizable gaseous medium disposed between said electrodes,
   a first source of AC voltage, a capacitor, impedance means, and rectifying means connected in series circuit to charge said capacitor at a rate determined by said impedance means,
   a second source of AC voltage,
   and circuit means connecting said capacitor, said impedance means, and said second source of AC voltage in series to the electrodes of said condition sensing means to apply the charge on said capacitor as a source of operating voltage to said electrodes, the quantity of electrical energy contained within said capacitor being such as to insure complete ionization of the gaseous medium between said electrodes upon the occurrence of an ionizing event within said condition sensing means.

2. A condition detector comprising:
   condition sensing means having an anode electrode, a cathode electrode, and an ionizable gaseous medium disposed between said electrodes, said cathode electrode being sensitive to electromagnetic wave energy of a given characteristic to liberate electrons therefrom and to initiate a gaseous discharge between said electrodes when a firing voltage is applied to said electrodes,
   and power supply means connected to the electrodes of said condition sensing means, said power supply means including a capacitor which is charged to a voltage of a magnitude below the firing voltage of said sensing means, and including a source of AC voltage connected in series with said capacitor, whereby during one-half of the AC source a voltage exceeding the firing voltage is applied to said electrodes and during the other half cycle a voltage less than the extinction voltage of said sensing means is applied to said electrodes, such that upon said sensing means experiencing wave energy of the given characteristic, said capacitor is suddenly discharged through said sensing means to insure complete ionization of the gaseous medium.

3. Condition detecting apparatus as defined in claim 2 wherein load means including integrating means is connected in series with the electrodes of said condition sensing means.

4. Detecting apparatus for detecting the occurrence of electromagnetic wave energy, comprising:
   gaseous discharge condition sensing means having an anode electrode, a cathode electrode, and an ionizable gaseous medium, said condition sensing means being constructed and arranged to pass electrical current by virtue of an avalanche discharge upon a firing voltage being applied to said electrodes and upon said sensing means experiencing electromagnetic wave energy of a given characteristic,
   first power supply means including means to charge a capacitor through a current limiting impedance, the charge on said capacitor being sufficiently high to initiate complete ionization of said sensing means and being sufficiently low to charge said capacitor to a voltage below said firing voltage,
   a source of AC voltage having a first and a second half cycle,
   and circuit means connecting said capacitor, said impedance means, and said source of AC voltage to the electrodes of said condition sensing means to apply a voltage to said electrodes which is above said firing voltage during said first half cycle of said AC source and apply a voltage to said electrode which is below the extinction voltage during said second half cycle of said AC source, to thereby quench said condition sensing means during said second half cycle.

5. Geiger tube condition sensing apparatus having a non-self-quenching Geiger tube with a firing voltage and an extinction voltage characteristic and with an anode and cathode disposed within a radiation permeable envelope containing an ionizable gaseous medium, the extent of ionization of the gaseous medium between said electrodes being determined by the initial surge of electrical current which flows through the Geiger tube upon the Geiger tube experiencing an ionizing event, the improvement comprising:
   DC power supply means including a capacitor having a given quantity of electrical energy stored therein to establish a voltage on said capacitor which is of a magnitude below the firing voltage of the Geiger tube, and means to replace said energy upon discharge of said capacitor, a source of AC voltage connected in series with said capacitor to the anode and cathode of the Geiger tube to apply the voltage of said capacitor to the electrodes of said Geiger tube, said AC voltage having a first half cycle which aids the voltage of said capacitor to apply a voltage to the electrodes which is above the firing voltage of the Geiger tube, and having a second half cycle which opposes the voltage of said capacitor to apply a voltage to the electrodes which is below the extinction voltage of the Geiger tube, the energy stored in said capacitor serving to provide a surge of electrical current to insure complete ionization of the gaseous medium upon the occurence of an ionizing event during said first half cycle, said second half cycle serving to quench said Geiger tube.

6. Power supply means for use with Geiger tube condition sensing means having a firing voltage and an extension voltage characteristic, and an anode electrode and a cathode electrode, to apply operating voltage to the electrodes of the Geiger tube and to quench the Geiger tube, the improvement comprising:

means providing a DC pedestal voltage capable of supplying a surge of current and incapable of applying a firing voltage to the electrodes, and means providing an AC voltage which is superimposed on said DC voltage, the Geiger tube having a voltage above the firing voltage applied to the electrodes during a first half cycle of said AC voltage and, upon experiencing an ionizing event during the first half cycle, passing electrical current of a magnitude sufficient to insure complete ionization of the Geiger tube having a voltage below the extinction voltage applied to the electrode during the succeeding half cycle of said AC voltage.

References Cited

UNITED STATES PATENTS 3,161,774  12/1964  Pinckaers _____ 250—83.3 X
3,205,359  9/1965   Giuffrida _____ 250—83.3 X ARCHIE R. BORCHELT, *Primary Examiner*.